(12) United States Patent
Wei et al.

(10) Patent No.: US 10,171,186 B2
(45) Date of Patent: Jan. 1, 2019

(54) METHOD AND DEVICE FOR DETECTING NOTCH BAND

(71) Applicant: MStar Semiconductor, Inc., Hsinchu Hsien (TW)

(72) Inventors: Fong Shih Wei, Hsinchu Hsien (TW); Kun-Yu Wang, Hsinchu Hsien (TW); Yi-Ying Liao, Hsinchu Hsien (TW); Ko-Yin Lai, Hsinchu Hsien (TW); Tai-Lai Tung, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/369,940

(22) Filed: Dec. 6, 2016

(65) Prior Publication Data

US 2017/0366283 A1    Dec. 21, 2017

(30) Foreign Application Priority Data

Jun. 21, 2016 (TW) .............................. 105119400 A

(51) Int. Cl.
*H04B 17/00* (2015.01)
*H04B 17/26* (2015.01)
*H04B 17/309* (2015.01)

(52) U.S. Cl.
CPC ........... *H04B 17/26* (2015.01); *H04B 17/309* (2015.01)

(58) Field of Classification Search
CPC ........ H04B 1/1027; H04B 1/71; H04B 1/123; H04B 1/1036; H04L 25/028; H04L 27/04; H04L 27/2634; H04J 11/003
See application file for complete search history.

(56) References Cited

U.S. PATENT DOCUMENTS

| | | | | |
|---|---|---|---|---|
| 8,891,700 B1* | 11/2014 | Kim | ................... | H04B 1/1027 375/285 |
| 9,214,185 B1* | 12/2015 | Song | ............... | G11B 20/10046 |
| 9,214,973 B1* | 12/2015 | Venkatesh | ............ | H04B 1/1036 |
| 2003/0210749 A1* | 11/2003 | Asjadi | ................ | H04L 27/2647 375/260 |
| 2003/0216122 A1* | 11/2003 | Cordone | ............. | H04B 1/1027 455/63.1 |
| 2006/0067381 A1* | 3/2006 | Chakravarthy | ...... | H04B 1/7143 375/130 |
| 2006/0083325 A1* | 4/2006 | Schenk | .................. | H04B 1/123 375/260 |
| 2006/0114981 A1* | 6/2006 | Ghosh | ...................... | H04L 1/20 375/232 |
| 2006/0146869 A1* | 7/2006 | Zhang | .................. | H04W 28/20 370/465 |

(Continued)

*Primary Examiner* — Berhanu Tadese

(74) *Attorney, Agent, or Firm* — Edell, Shapiro & Finnan, LLC

(57) ABSTRACT

A method for detecting a notch band is applied to a multi-carrier communication system that operates in a wideband. The method includes: receiving a received signal, and generating a plurality of frequency-domain signals according to the received signal; performing a magnitude operation on the frequency-domain signals to obtain a plurality of magnitude values; determining a plurality of ratios of a first magnitude set among the magnitude values to a second magnitude set among the magnitude value to determine whether the received signal contains a notch band.

12 Claims, 9 Drawing Sheets

(56) References Cited

U.S. PATENT DOCUMENTS

| | | | |
|---|---|---|---|
| 2007/0009011 A1* | 1/2007 | Coulson | H04B 1/1036 375/144 |
| 2008/0292032 A1* | 11/2008 | Belogolovy | H04L 27/2614 375/346 |
| 2008/0299932 A1* | 12/2008 | Belogolovy | H04L 27/2614 455/296 |
| 2009/0088092 A1* | 4/2009 | Wang | H04B 1/71 455/114.2 |
| 2009/0161804 A1* | 6/2009 | Chrabieh | H04J 11/0036 375/346 |
| 2009/0207925 A1* | 8/2009 | Liu | H04B 1/1036 375/260 |
| 2010/0208712 A1* | 8/2010 | Wax | H04B 17/345 370/338 |
| 2010/0329396 A1* | 12/2010 | Cheng | H04L 27/2647 375/343 |
| 2011/0116569 A1* | 5/2011 | Vaughan | H04B 1/0483 375/295 |
| 2011/0124291 A1* | 5/2011 | Gurney | H04W 16/14 455/63.2 |
| 2011/0305306 A1* | 12/2011 | Hu | H03H 21/0021 375/350 |
| 2012/0231742 A1* | 9/2012 | Barberis | H04W 16/10 455/63.1 |
| 2012/0238263 A1* | 9/2012 | Caretti | H04W 16/10 455/426.1 |
| 2012/0243596 A1* | 9/2012 | Lovell | H04L 25/0232 375/229 |
| 2012/0250802 A1* | 10/2012 | Okamoto | H03G 3/3078 375/340 |
| 2013/0045705 A1* | 2/2013 | Kapoor | H04B 1/1036 455/307 |
| 2013/0084821 A1* | 4/2013 | Kapoor | H04B 1/1036 455/307 |
| 2013/0115904 A1* | 5/2013 | Kapoor | H04B 1/1036 455/234.1 |
| 2013/0315351 A1* | 11/2013 | Yokokawa | H04B 1/1036 375/340 |
| 2013/0321707 A1* | 12/2013 | Takahashi | H04H 20/77 348/723 |
| 2013/0336431 A1* | 12/2013 | Goto | H04N 5/50 375/344 |
| 2013/0336433 A1* | 12/2013 | Takahashi | H04N 5/4401 375/350 |
| 2014/0009685 A1* | 1/2014 | Goto | H04L 27/2659 348/720 |
| 2014/0010332 A1* | 1/2014 | Okamoto | H04B 1/28 375/340 |
| 2014/0079103 A1* | 3/2014 | Currivan | H04L 5/0062 375/222 |
| 2014/0106697 A1* | 4/2014 | Wang | G01S 19/21 455/307 |
| 2014/0269841 A1* | 9/2014 | Goodman | H04B 1/715 375/133 |
| 2014/0273869 A1* | 9/2014 | Zhao | H04W 24/08 455/67.11 |
| 2015/0180690 A1* | 6/2015 | Sahlin | H04L 25/028 375/300 |
| 2015/0222322 A1* | 8/2015 | Moffatt | H04L 25/03057 375/136 |
| 2015/0280863 A1* | 10/2015 | Muqaibel | H04L 1/0048 375/350 |
| 2016/0094895 A1* | 3/2016 | Stadelmeier | H04H 20/59 725/33 |
| 2016/0164556 A1* | 6/2016 | Motwani | H04B 1/10 375/285 |
| 2016/0285509 A1* | 9/2016 | Wallis | H04L 27/2656 |
| 2017/0366283 A1* | 12/2017 | Wei | H04B 17/309 |

\* cited by examiner

METHOD AND DEVICE FOR DETECTING NOTCH BAND

This application claims the benefit of Taiwan application Serial No. 105119400, filed Jun. 21, 2016, the subject matter of which is incorporated herein by reference.

BACKGROUND OF THE INVENTION

Field of the Invention

The invention relates in general to a method and device for detecting a notch band, and more particularly to a method and device capable of accurately detecting a notch band.

Description of the Related Art

Multicarrier communication systems, operable in a wideband and having a high-speed transmission rate, are extensively applied in the daily life. However, in certain circumstances, a multicarrier communication system may include a notch band in the wideband; that is, the multicarrier communication system is capable of transmitting signals in parts of the wideband that are outside the notch band but not in the notch band. If a receiver of the multicarrier communication system cannot accurately detect such notch band, signals transmitted from a transmitter of the multicarrier communication system may not be corrected decoded, hence degrading the overall performance of the multicarrier communication system.

There is a known technology of a notch band detecting method applicable to an additive white Gaussian noise (AWGN) channel. However, in the event of severe multipath effects in the channel, the above notch band detecting method may yield a higher false alarm rate, which similarly degrades the overall performance of the multicarrier communication system.

Therefore, there is a need for a solution for accurately detecting a notch band.

SUMMARY OF THE INVENTION

It is a primary object of the present invention to provide a method and device for detecting a notch band to improve issues of the known technologies.

The present invention discloses a method for detecting a notch band and applied to a multicarrier communication system operating in a wideband. The method includes: receiving a received signal, and generating a plurality of frequency-domain signals according to the received signal; performing a magnitude operation on the frequency-domain signals to obtain a plurality of magnitude values, wherein the frequency-domain signals correspond to a plurality of frequencies in the wideband; and determining whether the received signal contains a notch band according to a plurality of ratios of a first magnitude set among the magnitude values to a second magnitude set among the magnitude values. Wherein, a first magnitude value in the first magnitude set corresponds to a second magnitude in the second magnitude set, and a first frequency where the first magnitude value is located is spaced from a second frequency where the second magnitude value is located by a fixed interval.

The present invention further discloses a device applied to a multicarrier communication system operating in a wideband. The device includes: a frequency transforming circuit, receiving a received signal, and generating a plurality of frequency-domain signals according to the received signal; a magnitude circuit, performing a magnitude operation on the frequency-domain signals to obtain a plurality of magnitude values; and a determining circuit, determining whether the received signal contains a notch band according to a plurality of ratios of a first magnitude set among the magnitude values to a second magnitude set among the magnitude values. Wherein, a first magnitude value in the first magnitude set corresponds to a second magnitude in the second magnitude set, and a first frequency where the first magnitude value is located is spaced from a second frequency where the second magnitude value is located by a fixed interval.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
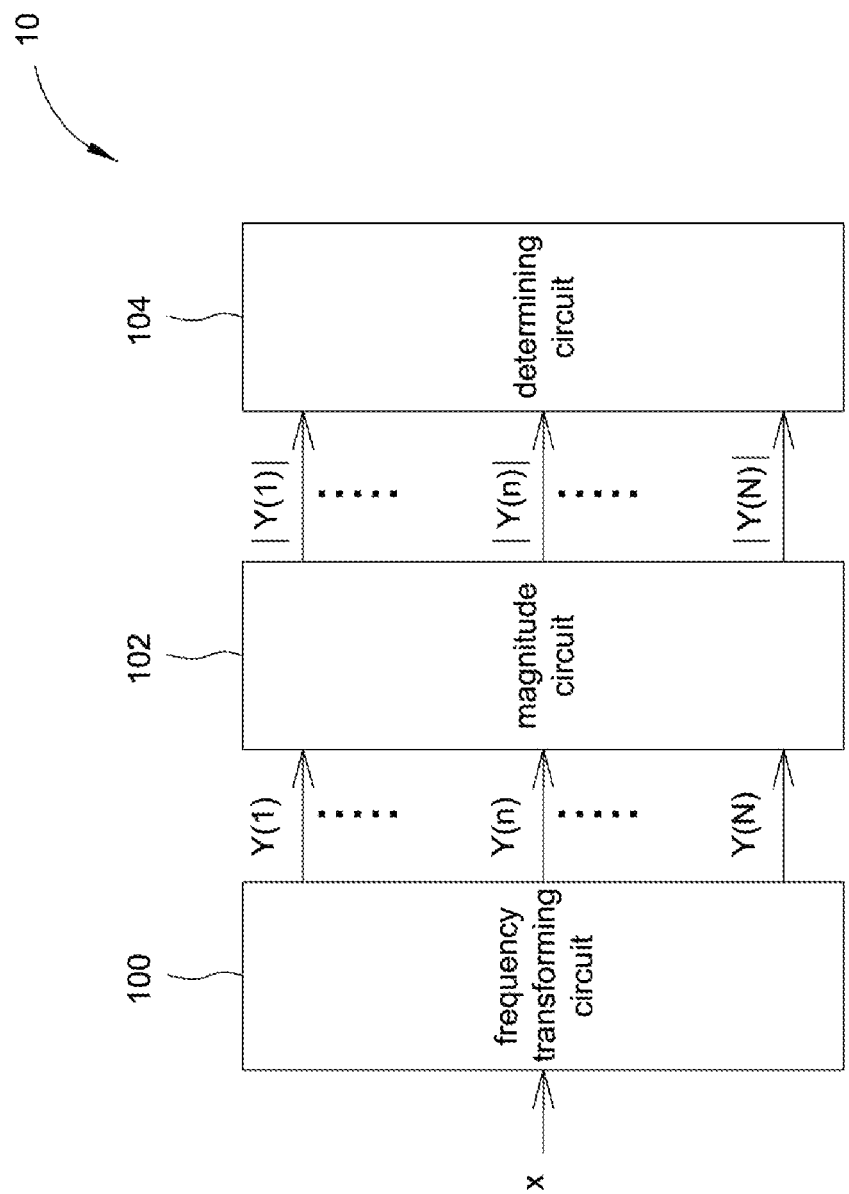
FIG. 1 is a block diagram of a detection device according to an embodiment of the present invention.

FIG. 1 shows a block diagram of a detection device 10 according to an embodiment of the present invention. The detection device 10 may be a receiver of a multicarrier communication system. The multicarrier communication system operates in a wideband, and may be a communication system such as a Digital Video Broadcast (DVB) or Long-Term Evolution (LTE) system. The detection device 10, capable of detecting whether a received signal of the detection device 10 contains a notch band in a preamble of the multicarrier communication system, includes a frequency transforming circuit 100, a magnitude circuit 102 and a determining circuit 104. The frequency transforming circuit 100 receives a received signal x in a time domain, and transforms the received signal x to a frequency domain to generate a plurality of frequency-domain signals Y(1) to Y(N). For example, the received signal x is an orthogonal frequency-division multiplexing (OFDM) or a discrete multi-tone (DMT) signal. The frequency transforming circuit 100 may perform a fast Fourier transform (FFT) operation. The frequency-domain signal Y(k) represents a frequency-domain signal of the received signal x at a $k^{th}$ frequency, and the plurality of frequency-domain signals Y(1) to Y(N) may include modulated signals modulated by the same amplitude. In another embodiment, the frequency-domain signals Y(1) to Y(N) may include modulated signals modulated by phase shift key (PSK). That is to say, the frequency-domain signals Y(1) to Y(N) may include modulated signals modulated by BPSK, QPSK, 16PSK and 64PSK modulation schemes. In yet another embodiment, the frequency-domain signals Y(1) to Y(N) may include modulated signals modulated by QPSK(4-QAM), 16QAM, 64QAM, 256QAM and other square QAM modulation schemes. The magnitude circuit 102 performs a magnitude operation on the frequency-domain signals Y(1) to Y(N) to obtain a plurality of magnitude values |Y(1)| to |Y(N)|. The determining circuit 104 determines whether the received signal x contains a notch band according to a plurality of ratios R(1) to R(N−L) of the magnitude values |Y(1)| to |Y(N−L)| (corresponding to a first magnitude set) to the magnitude values |Y(1+L)| to |Y(N)| (corresponding to a second magnitude set). Each magnitude value |Y(k)| among the magnitude values |Y(1)| to |Y(N−L)| corresponds to a magnitude value |Y(k+L)| among the magnitude values |Y(1+L)| to |Y(N)|, and the $k^{th}$ frequency where the magnitude value |Y(k)| is located is spaced from the $(k+L)^{th}$ frequency where the magnitude value |Y(k+L)| is located by a fixed interval (i.e., L frequencies). Further, the integer L (corresponding to the fixed interval) is a positive integer, and may be adjusted based on system requirements or actual conditions.

In one embodiment, the determining circuit 104 may sequentially calculate the ratio R(k) as the ratio of the magnitude value |Y(k)| to the magnitude value |Y(k+L)| (i.e., calculating the ratio R(k)=|Y(k)|/|Y(k+L)|), and determine whether the received signal x contains a notch band according to changes in the values of a plurality of ratios R(1) to R(N−L).

Figure 2:
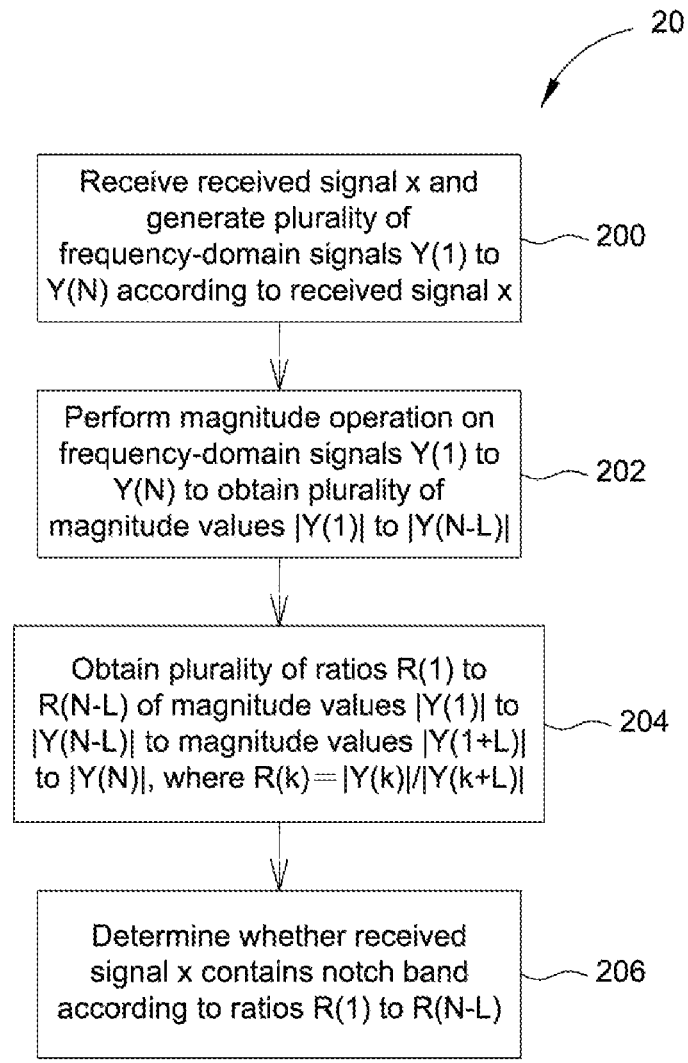
FIG. 2 is a flowchart of a detection process according to an embodiment of the present invention.

Operations of the detection device 10 determining whether the received signal x contains a notch band may be concluded into a detection process 20. FIG. 2 shows a flowchart of the detection process 20 according to an embodiment of the present invention. The detection process 20 may be performed by the detection device 10, and includes following steps.

In step 200, a received signal x is received, and a plurality of frequency-domain signals Y(1) to Y(N) are generated according to the received signal x.

In step 202, a magnitude operation is performed on the frequency-domain signals Y(1) to Y(N) to obtain a plurality of magnitude values |Y(1)| to |Y(N−L)|.

In step 204, a plurality of ratios R(1) to R(N−L) of the magnitude values |Y(1)| to |Y(N−L)| to the magnitude values |Y(1+L)| to |Y(N)| are obtained, wherein a ratio R(k)=|Y(k)|/|Y(k+L)|.

In step 206, it is determined whether the received signal x contains a notch band according to the ratios R(1) to R(N−L).

Operation details of the frequency transforming circuit 100 receiving the received signal x and generating the frequency-domain signals Y(1) to Y(N) in step 202, the magnitude circuit 102 obtaining the magnitude values |Y(1)| to |Y(N−L)| in step 202, and the determining circuit 104 obtaining the ratios R(1) to R(N−L) in step 204 may be referred from the associated description above, and shall be omitted herein. In step 206, the determining circuit 104 may determine whether the received signal x contains a notch band according to whether the ratios R(1) to R(N−L) are greater than a first threshold and whether the ratios R(1) to R(N−L) are smaller than a second threshold.

Figure 3:
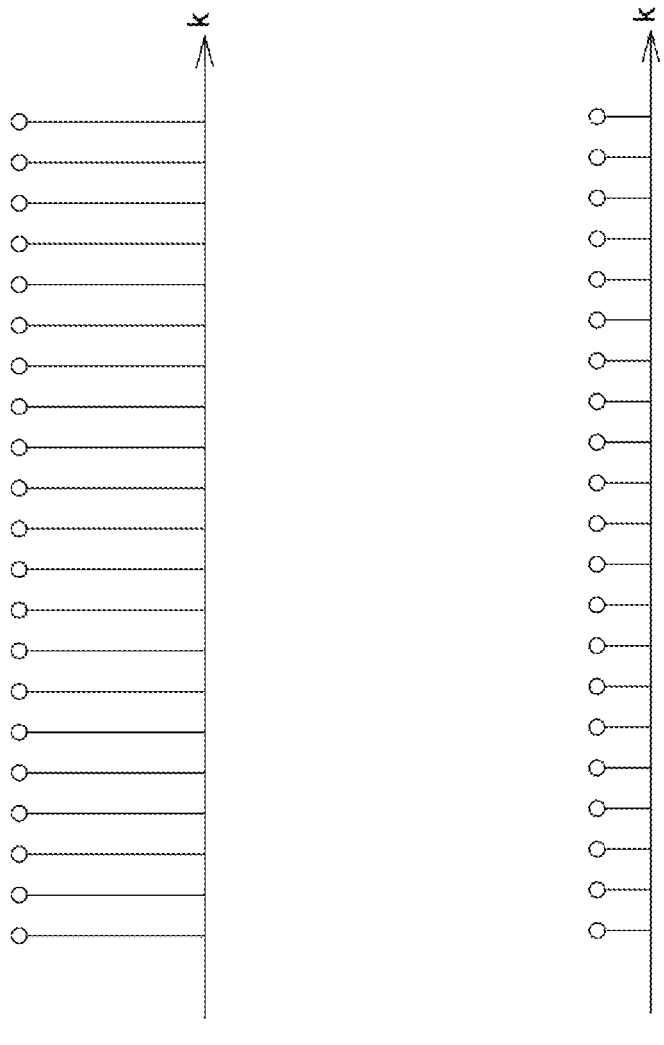
FIG. 3 is a schematic diagram of a plurality of magnitude values and a plurality of ratios when a received signal does not contain a notch band.
Figure 4:
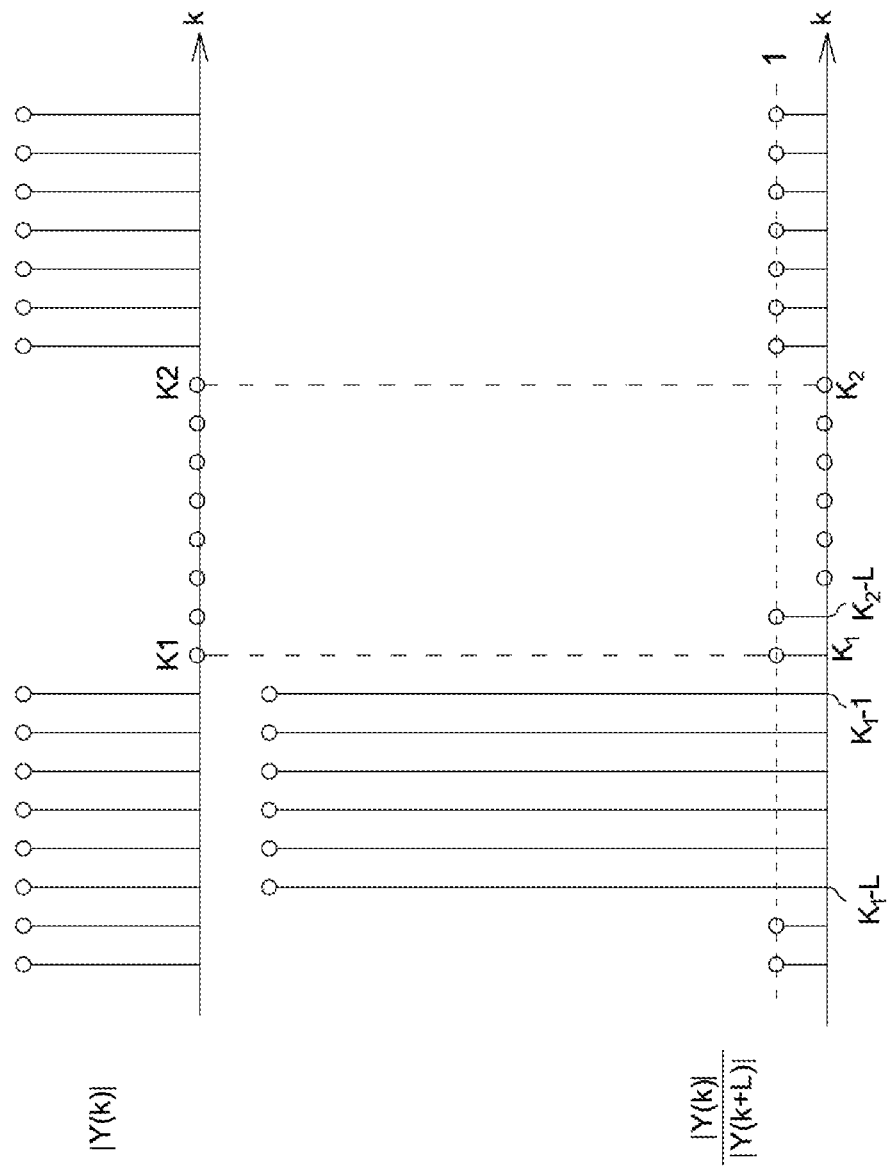
FIG. 4 is a schematic diagram of a plurality of magnitude values and a plurality of ratios when a received signal contains a notch band.

Referring to FIG. 3 and FIG. 4, FIG. 3 shows a schematic diagram of a plurality of magnitude values |Y(k)| and a plurality of ratios R(k) when the received signal x does not contain a notch band; FIG. 4 shows a schematic diagram of a plurality of magnitude values |Y(k)| and a plurality of ratios R(k) when the received signal x contains a notch band. For simplicity, FIG. 4 illustrates only changes of the magnitude value |Y(k)| and the ratio R(k) near a notch band. In the embodiment shown in FIG. 4, the notch band begins at a $K_1^{th}$ frequency and ends at a $K_2^{th}$ frequency (i.e., the notch band has a starting frequency $K_1$ and an ending frequency $K_2$). A bandwidth of the notch band is 8 frequencies (i.e., the bandwidth occupied by 8 subcarriers), and the integer L is 6.

It is known from FIG. 3 that, as the received signal x does not contain a notch band, and the magnitude values |Y(1)| to |Y(N−L)| are substantially equal, and so the ratios R(1) to R(N−L) are substantially equal to 1. In comparison, as shown in FIG. 4, as the received signal x contains a notch band, when the signal-to-noise ratio (SNR) of the multicarrier communication system is large, the magnitude values |Y($K_1$)| to |Y($K_2$)| within the notch band are far smaller than the magnitude value |Y(K)| outside the notch band. As a result, the ratios R(1) to R(N−L) change drastically near the notch band. More specifically, when k<$K_1$−L, the ratio R(k) is substantially equal to 1; when $K_1$−L≤k≤$K_1$, the ratio R(k) is far greater than 1. More specifically, the ratio R(k) is substantially equal to $\sqrt{SNR}$ when $K_1$−L≤k≤$K_1$ (wherein SNR represents the SNR of the receiver of the multicarrier communication system); the ratio R(k) is smaller than 1 and close to 0 when $K_2$−L≤k≤$K_2$. More specifically, the ratio R(k) is a reciprocal of SNR when $K_2$−L≤k≤$K_2$, i.e., the ratio R(k) is substantially $(\sqrt{SNR})^{-1}$ ($(\sqrt{SNR})^{-1}$ gets closer to 0 as SNR becomes larger).

In the above situation, the determining circuit 104 may determine whether the received signal x contains a notch band according to whether the ratios R(1) to R(N−L) change drastically. More specifically, the determining circuit 104 may determine whether a ratio R($M_1$) greater than a first threshold TH_1 exists among the ratios R(1) to R(N−L) to accordingly generate a first result Res_1. The determining circuit 104 may further determine whether a ratio R($M_2$) smaller than a second threshold TH_2 exists among the ratios R(1) to R(N−L) to accordingly generate a first result Res_2. When the first result Res_1 is true and the second result Res_2 is also true, the determining circuit 104 may determine that the received signal x contains a notch band. Wherein, the first result Res_1 being true means that a ratio R($M_1$) greater than the first threshold TH_1 exists among the ratios R(1) to R(N−L); the second result Res_2 being true means that a ratio R($M_2$) smaller than the second threshold TH_2 exists among the ratios R(1) to R(N−L). Preferably, the first threshold TH_1 may be greater than 10, and the second threshold TH_2 may be between 0.5 and 0.75. It should be noted that, the first threshold TH_1 and the second threshold TH_2 may be adjusted based on the SNR, system requirements and actual conditions of a receiver of a multicarrier communication system. In another embodiment, the first threshold TH_1 may be TH_1=½(1+$\sqrt{SNR}$), and second threshold TH_2 may be $$TH\_2 = \frac{1}{2}\left(1 + \frac{1}{\sqrt{SNR}}\right).$$

Figure 5:
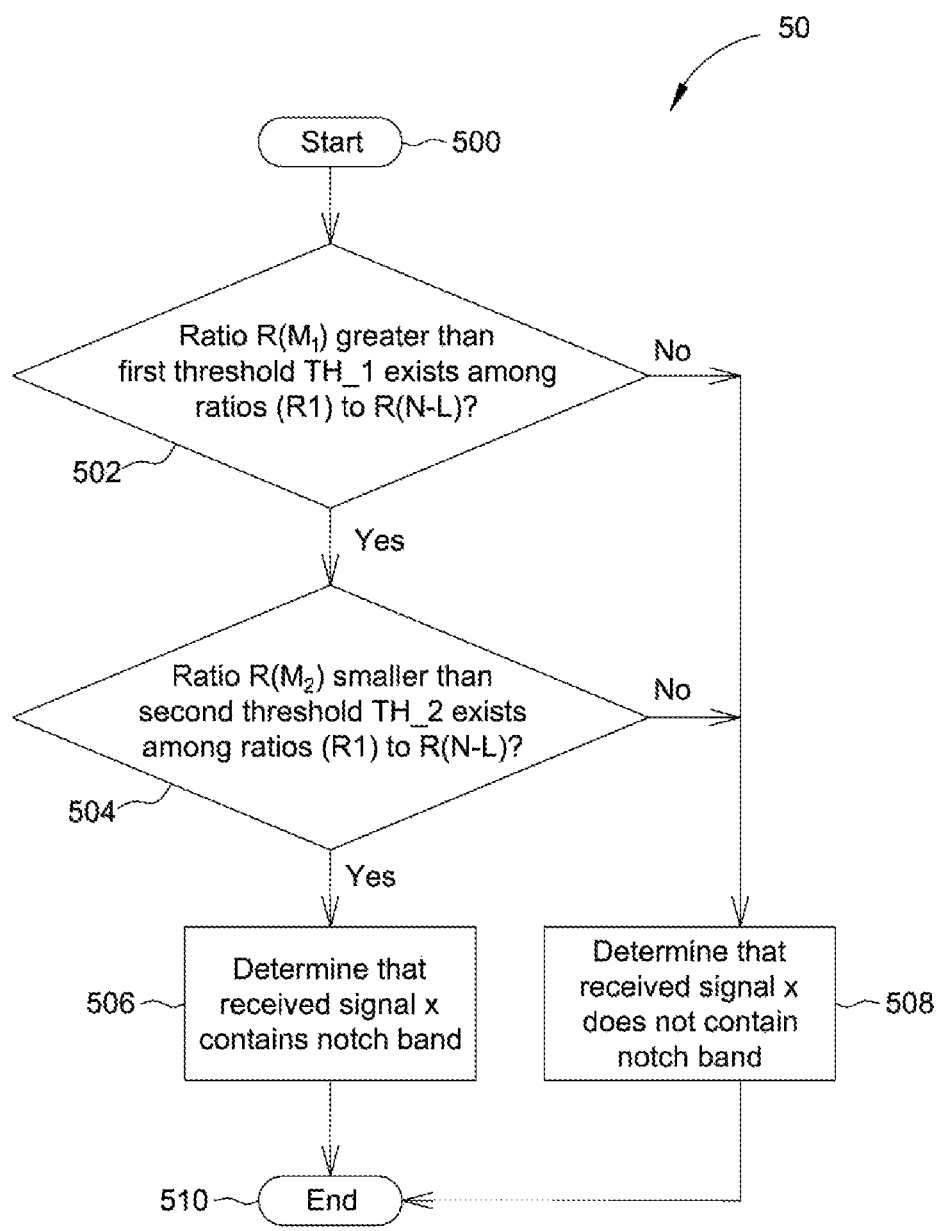
FIG. 5 is a flowchart of a detection process according to an embodiment of the present invention.

Operations of the determining circuit 104 determining whether the received signal x contains a notch band according to the ratios R(1) to R(N) may be further concluded into a detection process 50. FIG. 5 shows a flowchart of the detection process 50 according to an embodiment of the present invention. The detection process 50 may be performed by the determining circuit 104, and includes following steps.

In step 500, the detection process 50 begins.

In step 502, it is determined whether a ratio $R(M_1)$ greater than a first threshold TH_1 exists among the ratios R(1) to R(N−L). Step 504 is performed if so, otherwise step 508 is performed if not.

In step 504, it is determined whether a ratio $R(M_2)$ smaller than a second threshold TH_2 exists among the ratios R(1) to R(N−L). Step 506 is performed if so, otherwise step 508 is performed if not.

In step 506, it is determined that the received signal x contains a notch band.

In step 508, it is determined that the received signal x does not contain a notch band.

In step 510, the detection process 50 ends.

Operation details of the detection process 50 may be referred from the associated description above, and shall be omitted herein. According to the detection process 50, the determining circuit 104 may determine whether the received signal x contains a notch band according to the ratios R(1) to R(N−L). In addition, when the determining circuit 104 determines that the received signal x contains a notch band, the determining circuit 104 may further determine a band position of the notch band (i.e., a starting frequency and an ending frequency of the notch band) according to the ratios R(1) to R(N−L). For example, the determining circuit 104 may sequentially compare the ratio R(k) with the first threshold TH_1 from the $1^{st}$ frequency to the $(N-L)^{th}$ frequency. When the determining circuit 104 determines that a ratio $R(J_1)$ is greater than the first threshold TH_1 and a ratio $R(J_1+1)$ (the next frequency of the ratio $R(J_1)$) is not greater than the first threshold TH_1, the determining circuit 104 may determine that the frequency $R(J_1+1)$ (i.e., the $R(J_1+1)^{th}$ frequency) is a starting point of the notch band. Further, the determining circuit 104 may sequentially compare the ratio R(k) with a second threshold TH_2. When the determining circuit 104 determines that a ratio $R(J_2)$ is smaller than the second threshold TH_2 and a ratio $R(J_2+1)$ (the next frequency of the ratio $R(J_2)$) is not smaller than the second threshold TH_2, the determining circuit 104 may determine that the frequency $J_2$ (i.e., the $J_2^{th}$ frequency) is an ending frequency of the notch band. Thus, according to the frequency $(J_1+1)$ and the frequency $J_2$, the determining circuit 104 may obtain the band position of the notch band to further obtain the bandwidth of the wideband as $(J_2-J_1)$ frequencies (i.e., the bandwidth occupied by the $J_2-J_1$ sub-carriers).

Known from the above, the detection device 10 can determine not only whether the received signal x contains a notch band, but also the band position and bandwidth of the notch band when the received signal x contains the notch band. The determining circuit 104 may transmit information of the band position and the bandwidth of the notch band to a subsequent decoding circuit, which may then reduce an error rate of the receiver of the multicarrier communication system according to the information of the band position and the bandwidth of the notch band. As opposed to known technologies, the detection device 10 reduces a false alarm rate of a multicarrier communication system involving a multipath channel, i.e., a notch band is accurately detected to enhance the system performance of the multicarrier communication system.

More specifically, in a multipath channel, the false alarm rate of a conventional notch band detecting method is as high as 100%. In contrast, the method for detecting a notch band of the present invention reduces the false alarm rate to almost 0%. In other words, the method for detecting a notch band of the present invention reliably overcomes issues of known technologies.

It should be noted that, the foregoing embodiments are given to explain the concept of the present invention, and modifications may be made to those embodiments by one person skilled in the art without departing from the spirit of the present invention. For example, the ratio R(k), instead of being |Y(k)|/|Y(k+L)|, may be |Y(k−L)|/|Y(k)|, |Y(k+L)|/|Y(k)| or |Y(k)|/|Y(k−L)|, which are also encompassed within the scope of the present invention.

Figure 6:
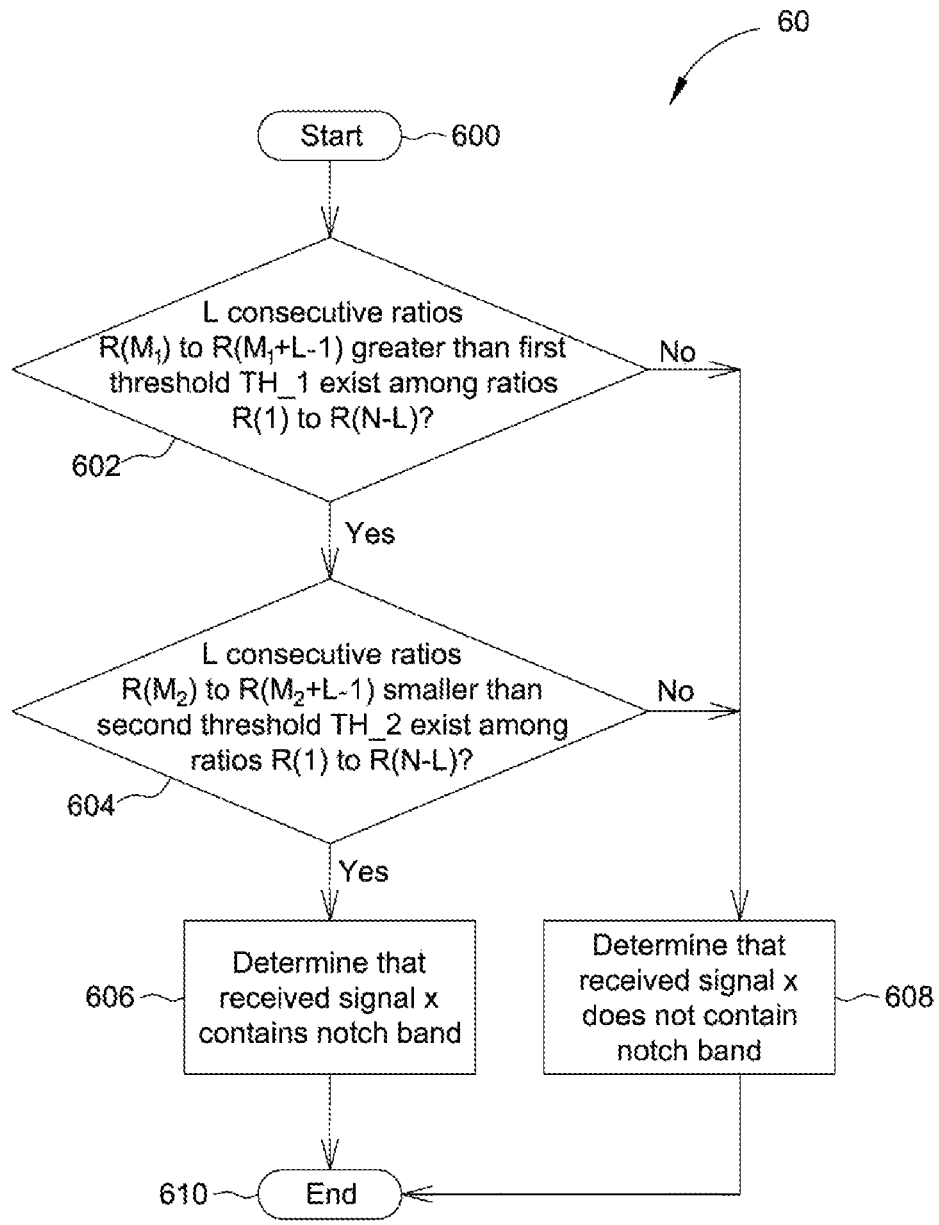
FIG. 6 is a flowchart of a detection process according to an embodiment of the present invention.

Further, different from the detection process 50, the determining circuit 104 may determine whether L consecutive (or adjacent) ratios $R(M_1)$ to $R(M_1+L-1)$ greater than the first threshold TH_1 exist among the ratios R(1) to R(N−L) to accordingly generate a first result Res_1'. The determining circuit 104 may further determine whether L consecutive (or adjacent) ratios $R(M_2)$ to $R(M_2+L-1)$ smaller than the second threshold TH_2 exist among the ratios R(1) to R(N−L) to accordingly generate a second result Res_2'. When the first result Res_1' is true and the second result Res_2' is also true, the determining circuit 104 may determine whether the received signal x contains a notch band. The above operations of the determining circuit 104 may be further concluded into a detection process 60. FIG. 6 shows a flowchart of the detection process 60 according to an embodiment of the present invention. The detection process 60 may be performed by the determining circuit 104, and includes following steps.

In step 600, the detection process 60 begins.

In step 602, it is determined whether L consecutive ratios $R(M_1)$ to $R(M_1+L-1)$ greater than the first threshold TH_1 exist among the ratios R(1) to R(N−L). Step 604 is performed if so, otherwise step 608 is performed if not.

In step 604, it is determined whether L consecutive ratios $R(M_2)$ to $R(M_2+L-1)$ smaller than the second threshold TH_2 exist among the ratios R(1) to R(N−L) to accordingly generate a second result Res_2'. Step 606 is performed if so, otherwise step 608 is performed if not.

In step 606, it is determined that the received signal x contains a notch band.

In step 608, it is determined that the received signal x does not contain a notch band.

In step 610, the detection process 60 ends.

The detection process 60 is similar to the detection process 50. One difference between the detection process 60 and the detection process 50 is that, in step 502, the determining circuit 104 generates the first result Res_1 when the determining circuit 104 determines that one single ratio $R(M_1)$ greater than the first threshold TH_1 exists; however, in step 602, the determining circuit 104 generates the first result Res_1' only when determining circuit 104 determines that L consecutive ratios $R(M_1)$ to $R(M_1+L-1)$ greater than the first threshold TH_1 exist. Similarly, in step 504, the determining circuit 104 generates the first result Res_2 when the determining circuit 104 determines that one single ratio $R(M_2)$ smaller than the second threshold TH_2 exists; however, in step 604, the determining circuit 104 generates the second result Res_2' only when determining circuit 104 determines that L consecutive ratios $R(M_2)$ to $R(M_2+L-1)$ smaller than the second threshold TH_2 exist.

Figure 7:
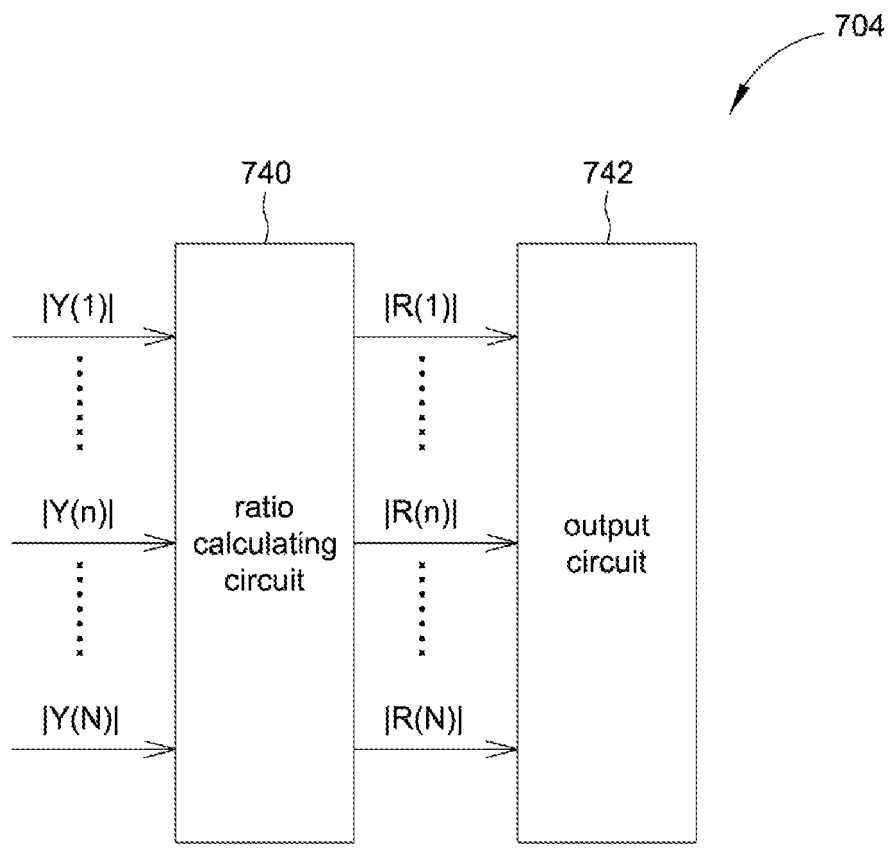
FIG. 7 is a block diagram of a determining circuit according to an embodiment of the present invention.

FIG. 7 shows a block diagram of a determining circuit 704 according to an embodiment of the present invention. Referring to FIG. 7, the determining circuit 704 may realize the determining circuit 104, and includes a ratio calculating circuit 740 and an output circuit 742. The ratio calculating circuit 740 receives a plurality of magnitude values |Y(1)| to |Y(N)| and sequentially calculates a plurality of ratios R(1) to R(N−L). The ratio calculating circuit 740 may include at least one divider (not shown in FIG. 7) that calculates the ratios R(1) to R(N−L). The output circuit 742 determines whether the received signal x contains a notch band according to changes in the values of the ratios R(1) to R(N−L).

Further, the determining circuit 104 is not limited to first calculating the ratios R(1) to R(N−L) and determining whether the received signal x contains a notch band according to the changes in the values of the ratios R(1) to R(N−L). For example, the determining circuit 104 may determine whether a magnitude $|Y(M_1)|$ greater than a product of a magnitude value $|Y(M_1+L)|$ (corresponding to the magnitude value $|Y(M_1)|$) multiplied by the first threshold TH_1 exists among the magnitude values |Y(1)|~|Y(N−L)|, and accordingly generates a third result Res_3. The determining circuit 104 may further determine whether a magnitude $|Y(M_2)|$ smaller than a product of a magnitude value $|Y(M_2+L)|$ (corresponding to the magnitude value $|Y(M_2)|$) multiplied by the second threshold TH_2 exists among the magnitude values |Y(1)|~|Y(N−L)|, and accordingly generates a fourth result Res_4. Wherein, the third result Res_3 being true means that the magnitude $|Y(M_1)|$ greater than the product of the magnitude value $|Y(M_1+L)|$ multiplied by the first threshold TH_1 exists among the magnitude values |Y(1)|~|Y(N−L)|, the fourth result Res_4 being true means that the magnitude $|Y(M_2)|$ smaller than the product of the magnitude value $|Y(M_2+L)|$ multiplied by the second threshold TH_2 exists among the magnitude values |Y(1)|~|Y(N−L)|. It should be noted that, the third result Res_3 and the first result Res_1 are equivalent (or referred to as if and only if) determination results; the fourth result Res_4 and the second result Res_2 are equivalent determination results. In other words, when the third result Res_3 is true and the fourth result Res_4 is also true, the determining circuit 104 may determine that the received signal x contains a notch band.

Figure 8:
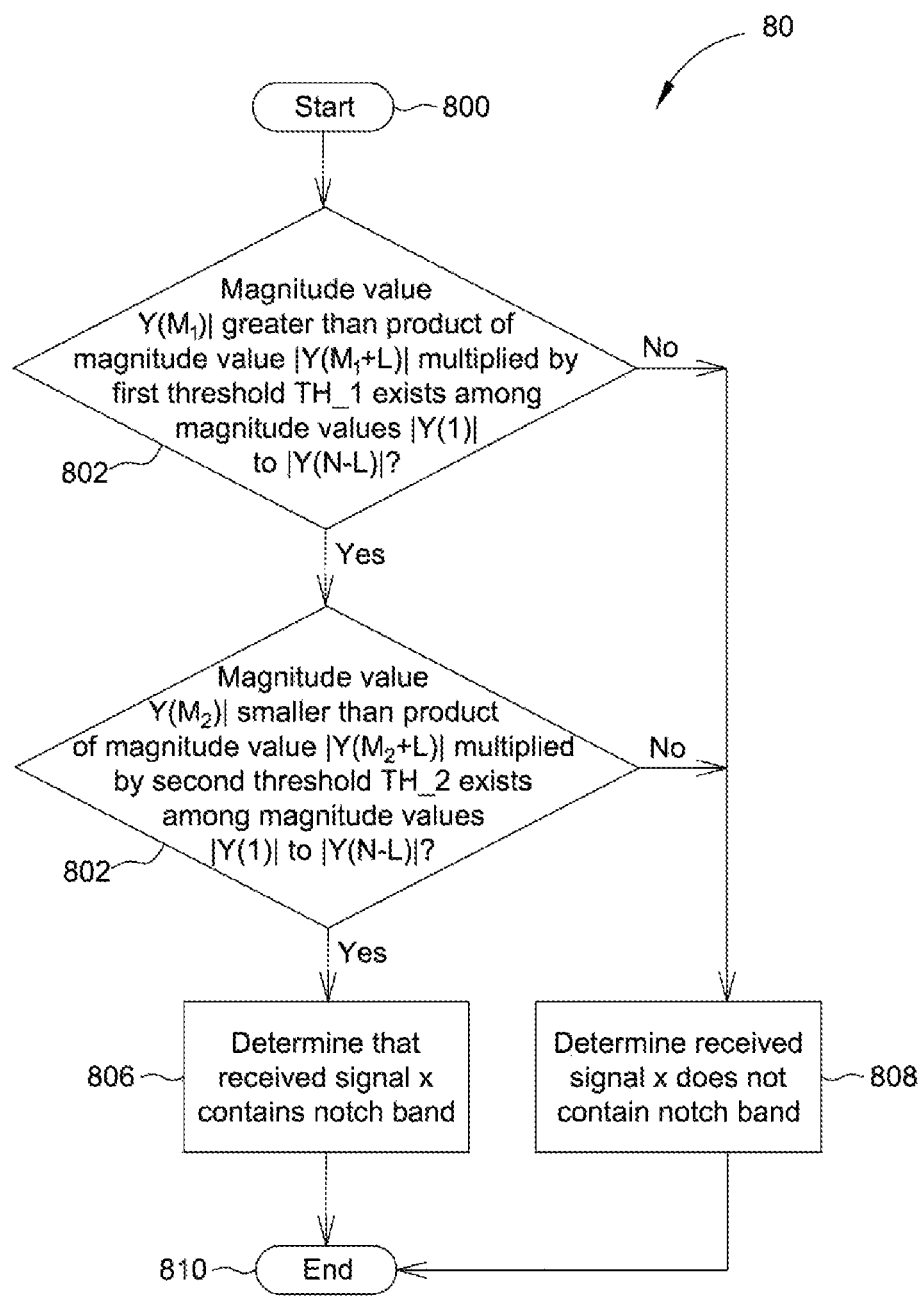
FIG. 8 is a flowchart of a detection process according to an embodiment of the present invention.

The operations of the determining circuit 104 determining whether the received signal x contains a notch band may be further concluded into a detection process 80. FIG. 8 shows a flowchart of the detection process 80 according to an embodiment of the present invention. The detection process 80 may be performed by the determining circuit 104, and includes following steps.

In step 800, the detection process 80 begins.

In step 802, it is determined whether a magnitude value $|Y(M_1)|$ greater than a product of a magnitude value $|Y(M_1+L)|$ multiplied by the first threshold TH_1 exists among the magnitude values |Y(1)| to |Y(N−L)|. Step 804 is performed if so, otherwise step 808 is performed if not.

In step 804, it is determined whether a magnitude value $|Y(M_2)|$ smaller than a product of a magnitude value $|Y(M_2+L)|$ multiplied by the second threshold TH_2 exists among the magnitude values |Y(1)| to |Y(N−L)|. Step 806 is performed if so, otherwise step 808 is performed if not.

In step 806, it is determined that the received signal x contains a notch band.

In step 808, it is determined that the received signal x does not contain a wide band.

In step 810, the detection process 80 ends.

Operation details of the detection process 80 may be referred from associated description above, and shall be omitted herein. It should be noted that, in steps 802 and 804, although the determining circuit 104 does not directly calculate the ratios R(1) to R(N−1), steps 802 and 804 are equivalently calculating the ratios R(1) to R(N−1) and then accordingly determining whether the received signal x contains a notch band according to the changes in the values of the ratios R(1) to R(N−1). That is, steps 802 and 804 are substantially another embodiment of "determining whether a notch band is contained according to the ratios R(1) to R(N−L) of the magnitude values |Y(1)| to |Y(N−L)| (corresponding to a first magnitude set) to the magnitude values |Y(1+L)| to |Y(N)| (corresponding to a second magnitude set)", which is also encompassed within the scope of the present invention.

Figure 9:
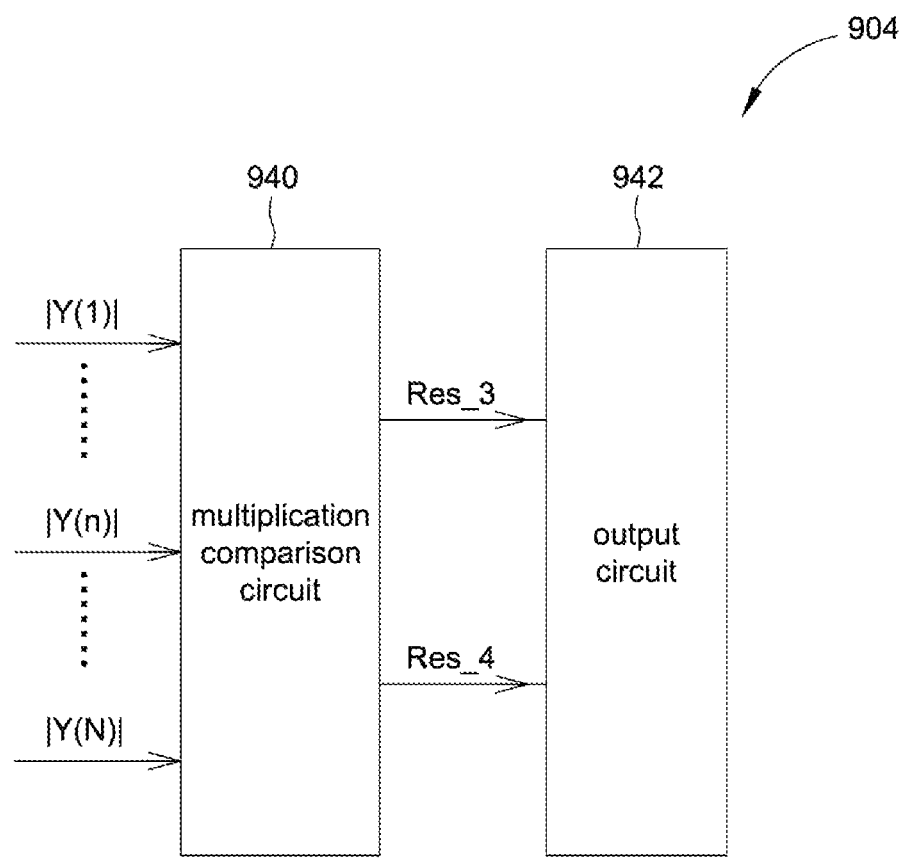
FIG. 9 is a block diagram of a determining circuit according to an embodiment of the present invention.

FIG. 9 shows a block diagram of a determining circuit 904 according to another embodiment of the present invention. Referring to FIG. 9, the determining circuit 904 may realize the determining circuit 104, and includes a multiplication comparison circuit 940 and an output circuit 942. The multiplication comparison circuit 940 performs step 802 and step 804, and transmits the third result Res_3 and the fourth result Res_4 generated in step 802 and step 804 to the output unit 942, which may then perform step 806 and step 808 according to the third result Res_3 and the fourth result Res_4. The multiplication comparison circuit 940 may include at least one multiplier (not shown in FIG. 9) and at least one comparator (not shown in FIG. 9). The multiplier multiplies the magnitude value $|Y(M_1+L)|$ by the magnitude value $|Y(M_1)|$ of the first threshold TH_1 to generate a product (to be referred to as a first multiplication result) in step 802, and multiplies the magnitude value $|Y(M_2+L)|$ by the magnitude value $|Y(M_2)|$ of the second threshold TH_2 to generate another product (to be referred to as a second multiplication result) in step 804. The comparator determines whether the magnitude value $|Y(M_1)|$ greater than the first multiplication result exists among the magnitude values |Y(1)| to |Y(N−L)| to generate the third result Res_3 in step 802, and determines whether the magnitude value $|Y(M_2)|$ smaller than the second multiplication result exists among the magnitude values |Y(1)| to |Y(N−L)| to generate the fourth result Res_4 in step 804.

Generally known to one person skilled in the art, the frequency transforming circuit 100, the magnitude circuit 102 and the determining circuits 104, 704 and 904 may be realized or implemented by digital circuits (e.g., register-transfer logic (RTL) circuits) or digital signal processors (DSP), and associated details shall be omitted herein.

In conclusion, using a plurality of ratios of a first magnitude set to a second magnitude set of a plurality of magnitude values, the present invention is capable of accurately determining whether a received signal contains a notch band.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for detecting a notch band in a bandwidth of a frequency spectrum of a received signal, applied to a multicarrier system operating in a wideband, the method comprising:
receiving the received signal, and generating a plurality of frequency-domain signals according to the received signal;
performing a magnitude operation on the plurality of frequency-domain signals to obtain a plurality of magnitude values; and
determining whether there is a notch band in the bandwidth of the frequency spectrum of the received signal according to a plurality of ratios of a first magnitude set among the plurality of magnitude values to a second magnitude set among the plurality of magnitude values;
wherein, a first magnitude value in the first magnitude set corresponds to a second magnitude value in the second magnitude set, and a frequency where the first magnitude value is located is spaced from a second frequency where the second magnitude value is located by a fixed interval,
wherein the step of determining whether there is a notch band in the bandwidth of the frequency spectrum of the received signal according to the plurality of ratios of the first magnitude set among the plurality of magnitude values to the second magnitude set among the plurality of magnitude values comprises;
obtaining the plurality of ratios of the first magnitude set among the plurality of magnitude values to the second magnitude set among the plurality of magnitude values; and
determining whether there is a notch band in the bandwidth of the frequency spectrum of the received signal according to the plurality of ratios; and
wherein the step of obtaining the plurality of ratios comprises:
obtaining each of the plurality of ratios as a ratio of a third magnitude value in the first magnitude set to a fourth magnitude value in the second magnitude set corresponding to the third magnitude value.

2. The method according to claim 1, wherein the step of determining whether there is a notch band in the bandwidth of the frequency spectrum of the received signal according to the plurality of ratios comprises:
determining whether a first ratio greater than a first threshold exists among the plurality of ratios, and generating a first result;
determining whether a second ratio smaller than a second threshold exists among the plurality of ratios, and generating a second result; and
determining whether there is a notch band in the bandwidth of the frequency spectrum of the received signal according to the first result and the second result.

3. The method according to claim 2, wherein the first threshold is greater than 10, and the second threshold is between 0.25 and 0.75.

4. The method according to claim 2, wherein the step of determining whether there is a notch band in the bandwidth of the frequency spectrum of the received signal according to the first result and the second result comprises:
determining that there is a notch band in the bandwidth of the frequency spectrum of the received signal when the first result is true and the second result is true;
wherein, the first result being true means that the first ratio greater than the first threshold exists among the plurality of ratios, and the second result being true means that the second ratio smaller than the second threshold exists among the plurality of ratios.

5. The method according to claim 2, further comprising:
determining a bandwidth of the notch band in the bandwidth of the frequency spectrum of the received signal according to a third frequency corresponding to the first ratio and a fourth frequency corresponding to the second ratio when the first result is true and the second result is true.

6. The method according to claim 1, further comprising:
determining whether a fifth magnitude value greater than a product of a sixth magnitude value in the second magnitude set multiplied by a first threshold exists in the first magnitude set to generate a third result, wherein the fifth magnitude value corresponds to the sixth magnitude value;
determining whether a seventh magnitude value smaller than a product of an eighth magnitude value in the second magnitude set multiplied by a second threshold exists in the first magnitude set to generate a fourth result, wherein the seventh magnitude value corresponds to the eighth magnitude value; and
determining that the received signal contains the notch band in the bandwidth of the frequency spectrum of the received signal when the third result is true and the fourth result is true;
wherein, the third result being true means that the fifth magnitude value is greater than the product of the sixth magnitude value multiplied by the first threshold, and the second result being true means that the seventh magnitude value is smaller than the product of the eighth magnitude value multiplied by the second threshold.

7. A device, applied to a multicarrier communication system operating in a wideband, comprising:
a frequency transforming circuit, receiving a received signal, and generating a plurality of frequency-domain signals according to the received signal;
a magnitude circuit, performing a magnitude operation on the plurality of frequency-domain signals to obtain a plurality of magnitude values; and
a determining circuit, determining whether there is a notch band in a bandwidth of a frequency spectrum of the received signal according to a plurality of ratios of a first magnitude set among the plurality of magnitude values to a second magnitude set among the plurality of magnitude values;
wherein, a first magnitude value in the first magnitude set corresponds to a second magnitude value in the second magnitude set, and a frequency where the first magnitude value is located is spaced from a second frequency where the second magnitude value is located by a fixed interval,
wherein the determining circuit further performs steps below to obtain the plurality of ratios:
obtaining the plurality of ratios of the first magnitude set among the plurality of magnitude values to the second magnitude set among the plurality of magnitude values; and
determining whether there is a notch band in the bandwidth of the frequency spectrum of the received signal according to the plurality of ratios; and
wherein the determining circuit further performs a step below to obtain the plurality of ratios:
obtaining each of the plurality of ratios as a ratio of a third magnitude value in the first magnitude set to a fourth magnitude value in the second magnitude set corresponding to the third magnitude value.

8. The device according to claim 7, wherein the determining circuit further performs steps below to determine whether the received signal contains the notch band:
  determining whether a first ratio greater than a first threshold exists among the plurality of ratios, and generating a first result;
  determining whether a second ratio smaller than a second threshold exists among the plurality of ratios, and generating a second result; and
  determining whether there is a notch band in the bandwidth of the frequency spectrum of the received signal according to the first result and the second result.

9. The device according to claim 8, wherein the first threshold is greater than 10, and the second threshold is between 0.25 and 0.75.

10. The device according to claim 8, wherein the determining circuit further performs a step below to determine whether there is a notch band in the bandwidth of the frequency spectrum of the received signal according to the first result and the second result:
  determining that there is a notch band in the bandwidth of the frequency spectrum of the received signal when the first result is true and the second result is true;
  wherein, the first result being true means that the first ratio greater than the first threshold exists among the plurality of ratios, and the second result being true means that the second ratio smaller than the second threshold exists among the plurality of ratios.

11. The device according to claim 8, wherein the determining circuit further performs a step of:
  determining a bandwidth of the notch band according to a third frequency corresponding to the first ratio and a fourth frequency corresponding to the second ratio when the first result is true and the second result is true.

12. The device according to claim 7, wherein the determining circuit further performs steps of:
  determining whether a fifth magnitude value greater than a product of a sixth magnitude value in the second magnitude set multiplied by a first threshold exists in the first magnitude set to generate a third result, wherein the fifth magnitude value corresponds to the sixth magnitude value;
  determining whether a seventh magnitude value smaller than a product of an eighth magnitude value in the second magnitude set multiplied by a second threshold exists in the first magnitude set to generate a fourth result, wherein the seventh magnitude value corresponds to the eighth magnitude value; and
  determining that there is a notch band in the bandwidth of the frequency spectrum of the received signal when the third result is true and the fourth result is true;
  wherein, the third result being true means that the fifth magnitude value is greater than the product of the sixth magnitude value multiplied by the first threshold, and the second result being true means that the seventh magnitude value is smaller than the product of the eighth magnitude value multiplied by the second threshold.

* * * * *